UNITED STATES PATENT OFFICE.

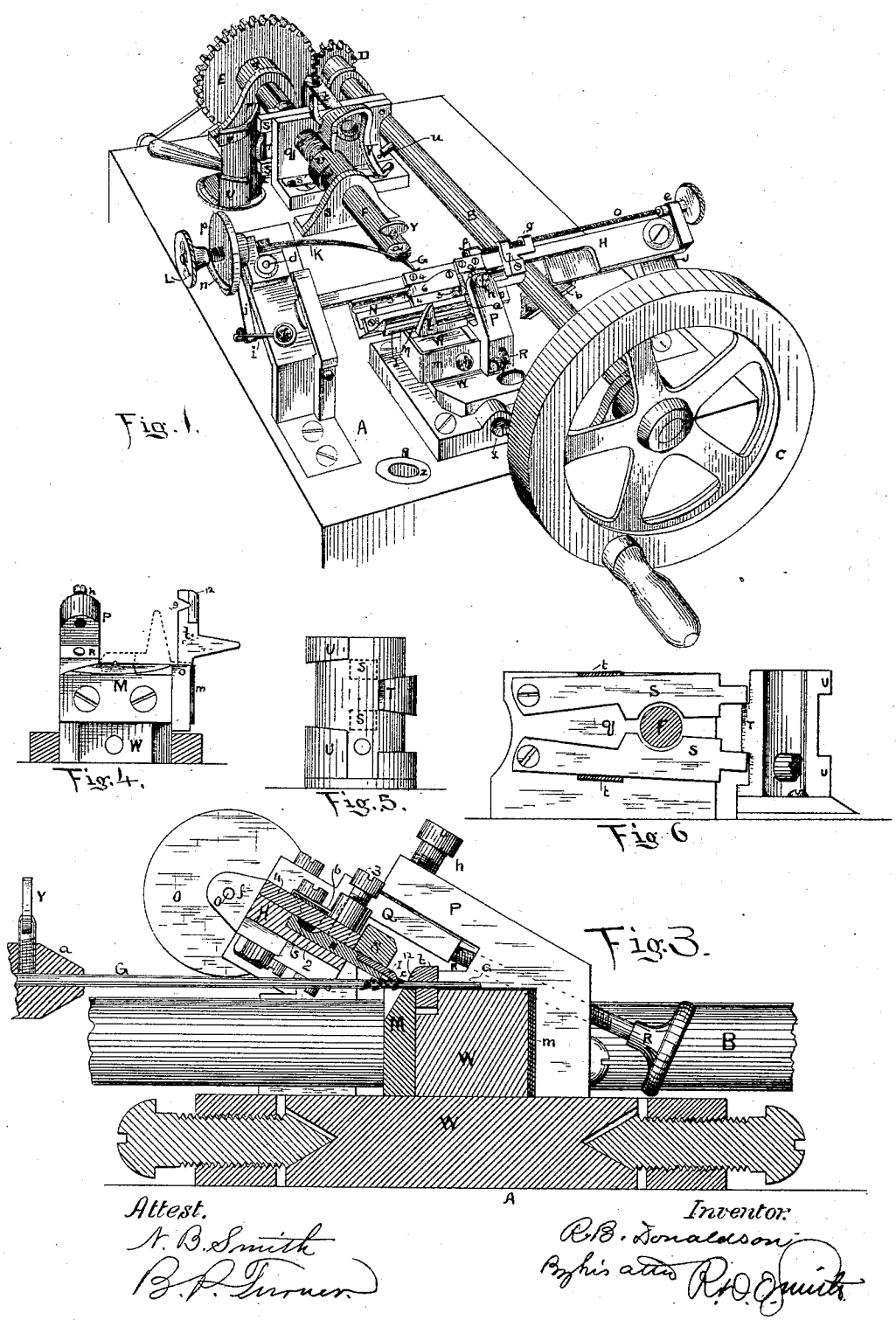

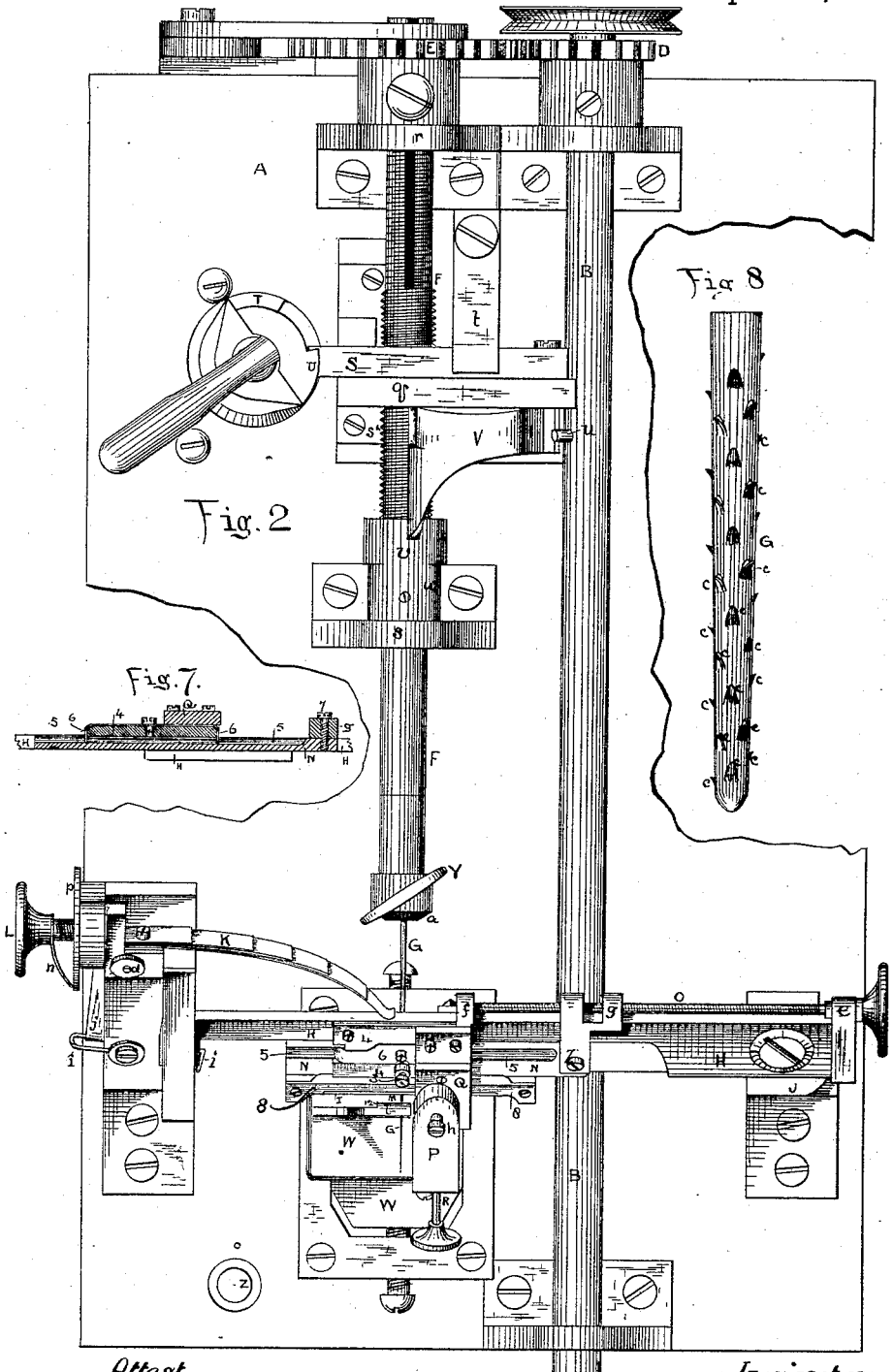

ROBERT B. DONALDSON, OF WASHINGTON, DISTRICT OF COLUMBIA.

MACHINE FOR BARBING DENTAL BROACHES, &c.

SPECIFICATION forming part of Letters Patent No. 327,437, dated September 29, 1885.

Application filed August 4, 1885. (No model.)

*To all whom it may concern:*

Be it known that I, ROBERT BRUCE DONALDSON, of Washington, in the District of Columbia, have invented a new and useful Machine for Barbing Dentists' Instruments for Scraping and Cleaning out the Nerve Canals in Teeth, and for other purposes; and I do hereby declare that the following is a full and accurate description of the same.

The class of instruments which this machine is adapted to provide with barbs is illustrated in Patent No. 322,265, granted to me July 14, 1885, though, as will be apparent, the same mechanism may be caused to cut a single line of barbs along one side either of a round, angular, or flat tool by changing the relative speeds, so as to produce one blow of the knife at each revolution of the blank, or by causing the blank to travel without revolving.

For the purpose of a dental broach or bristle, however, I prefer to cut the barbs in a spiral line around the tapered blade, as shown in my said patent, and I think it is preferable to arrange the feed-gearing so as to deliver three cutting-blows during, say, six-sevenths ($\frac{6}{7}$) of one revolution of the blank, and thus produce the cuts in a spiral line, alternating, whereby the blade is not unduly weakened, and the scraping-barbs are practically presented in all directions. Also, for the purpose of a dental broach it is necessary that the shaft shall be barbed to its extreme end, so that said shaft shall not extend beyond its farthest point of action.

In the accompanying drawings, Figure 1 is a perspective view of my machine. Fig. 2 is a plan of the same. Fig. 3 is a longitudinal section through the cutting device enlarged. Figs. 4, 5, and 6 are details. Fig. 7 is a longitudinal section of the knife-carriage. Fig. 8 is a greatly enlarged view of the dental broach.

A is the bed-plate or foundation upon which my devices are mounted. Said bed-frame may be made of any suitable material, but metal is preferable. The motive power is applied to a main shaft, B, which, as represented, is provided with a hand-wheel, C; but it may be driven by power, if preferred. The shaft B is provided with a gear-wheel, D, which meshes with another gear-wheel, E, whereby the feed device is operated. Said feed device consists of a screw-shaft, F, having at one end a chuck, $a$, whereby the blank is held. When the wheel E is caused to rotate, the screw-shaft F is also caused to rotate and at the same time move endwise, so as to both rotate and feed the blank G. In order to allow the shaft F the required endwise motion the gear-wheel E is fitted loosely upon it, having a pin or feather in its hub, which, entering a longitudinal slot in the shaft, gives it its rotary motion without interfering with its end-play. The shaft B is provided with one or more tappets, $b$, whereby the knife-arm H is raised or released to deliver its blow. The knife I is attached to the knife-bar by any convenient means, and moves in a plane oblique to the axis of the blank G, so as to cut and raise the scrapers $c$, as shown and described. The knife-bar is therefore mounted upon a fulcrum, J, oblique to the axis of the blank. The knife is impelled forward to deliver its blow by any convenient force, as a spring, gravity, or a weight; but a spring is preferable, because its tension can be modulated with ease and certainty. I therefore apply to the back of the knife-bar a spring, K, mounted on a pivot-pin, $d$, and controlled by a tension-screw, L.

It is extremely important that these delicate instruments shall be kept straight during the process of cutting, and therefore that the blank G shall be supported by a rigid anvil when it receives the blow of the knife. It is also important that each barb shall pass off said anvil before the succeeding one is formed, or there would be liability that the cutting of one barb would injure the preceding one by battering it down. I therefore arrange my knife to strike close to the edge of the anvil M, which anvil is of hardened steel rigidly attached to the anvil-block W, the feed of the instrument being such that each barb is removed beyond the edge of the anvil before the succeeding one is formed. These are the active and effective instruments, but they require several attachments of refinement to fully adapt the machine to do the delicate work required with uniformity and convenience.

As the steel from which I prefer to make my broaches is hard piano-wire, or other similar hard steel, it is necessary that the knife shall be sharp, but the edge will remain sharp only a short time in use. Therefore it is necessary to renew the edge frequently, and to avoid the trouble of frequent removal and replacement of the knife for sharpening, I make my knife I adjustable by attaching it to a carriage, N, which is capable of traveling along the knife-bar H under control of a screw, o, which revolves in bearings e f, attached to the knife-bar H, and engages with the female clip g, attached to the carriage N. The carriage N may be attached to the knife-arm H, with liberty to move thereon, in a variety of ways familiar to mechanics; but to facilitate its removal when necessary, as well as to provide for a snug seat without shake when the blow is delivered I prefer the structure shown— to wit, the knife-arm H is provided with a plate, 2, extending from said arm underneath the carriage N, as shown in Figs. 3 and 7, to form a bed whereon said carriage may slide. A top plate, 4, is attached to said arm by screws and projects over the top of said carriage parallel with the plate 2. A bearing-screw, 3, inserted through said plate 4 bears upon the upper surface of the carriage N with proper pressure to prevent shake, but not to prevent free motion. The carriage is provided with a longitudinal groove, 5, and the plate 4 is provided with one or more springs, 6, the free ends of which dip downward and rest in said groove with slight pressure toward the knife-arm. Therefore the forward and backward movement of the carriage N will be always under elastic pressure and smooth. To detach said carriage, the screw 7 or other attachment of said carriage, with the clip g, is removed, and the springs 6 will readily yield and slip out of the groove 5.

The knife I is attached to the carriage N by a clamp-bar, 8, or other suitable means.

The anvil-block W is provided with an oblique arm, P, extending up over an arm, Q, which is attached to the knife-bar H, and a regulating-screw, h, passes through said arm P and bears lightly upon said arm Q as the cutting-blow is delivered, the object being to prevent any deflection of the knife by torsion of the knife-bar. A regulating-screw is also inserted through the arm P, to receive the arm Q and thus arrest the downward motion of the knife-bar H, so as to limit the depth of the cut.

A relieving-spring, i, is also employed to cause a slight retreat of the knife after the blow has been delivered, and insure the freedom of the knife-edge from the cut it has just made. The tension of said relief-spring may be varied at will by changing the position of the movable support j.

A clamp, l, pivoted to the anvil-block W, and held in position by a spring, m, moves in a plane perpendicular to the axis of the blank and serves to hold it in position on the anvil while it is being barbed. This clamp is provided with a V-shaped notch, 9, on its under side, the angles of which, when it is pressed down by the spring m, bear with moderate pressure upon the upper side of the blank as it rests on the smooth surface of the anvil. This clamp is seated in a shallow recess or slot between the anvil M and block W. This slot is deep enough to allow the lower edge of said clamp to pass as far below the face of the anvil as the apex of the V-shaped notch, but not deep enough to interfere with the screws which secure the anvil to the block. By this arrangement all portions of the tapering blank are held with equal steadiness and freedom from lateral movement which would interfere with regularity in the cutting of the barbs.

The elastic pressure of the spring m not only retains said blank exactly in position, but retains its tendency to bend under the blow of the knife. The clamp l is provided with an overhanging portion, 12, extending at either side of the notch 9, and extending laterally almost to the point where the blow of the knife I is received. The object of this shoulder 12 is to continue the pressure of the clamp upon the blank until the terminal scraper c has been cut. By these means, including the backward feed whereby the cutting progresses toward and terminates at the point, the blank is supported up to the instant before the last cutting-blow is delivered, and the terminal barb has been cut at the extremity of the instrument.

For convenience in removing the barbed instruments and inserting new blades the clamp l may be thrown into an upright position, where it is out of the way, and its pivoted end is so shaped that the spring m maintains it in either its upright or horizontal position.

The spring K determines the force of the blow, and this will be greater or less according to the size of the broach to be barbed. By turning the screw L forward the tension of the spring will be increased; by turning said screw backward it will be diminished; and to enable the attendant to judge from time to time, and to regain a certain tension after a change has been made, I attach to said screw a suitable pointer, n, the position of which as to the dial p may be observed and regained without trouble.

The pitch of the screw of the shaft F determines the pitch of spiral line of scrapers produced on the blank G. For convenience the nut S is divided and its parts separately pivoted to the plate or standard, so that when they are separated the shaft F may slide freely back and forth in the bearings r s. This is for convenience in returning it to its initial position when the new blank has been placed in the machine. Springs t t tend always to close the split nut upon the screw.

A revolving cam, T, is arranged so that when rotated in one direction it will strike between the extended ends of the divided nut S, and separate them so as to leave the screw free, and when rotated in the other direction the oblique ribs U U will strike on the exterior surface of said extended ends and lock them in position; but these parts are so adjusted that when the threads of the nut are not in proper engagement with the threads of the screw the ends of the ribs U will strike the sides of said extended ends of the nut and not pass over to lock them.

It is desirable that the backward movement of the screw-shaft F shall not be continued so far as to run the thread out of the nut, which, being locked in position, cannot then open, and the thread would therefore be injured. I therefore put upon the shaft B a stop-pin, $u$, and I pivot to the frame a stop-arm, V, with one end resting on a cylindrical enlargement, $v$, of the shaft F, and when said shaft has completed its full movement said arm V passes off said enlargement, and the other end engages said stop-pin to arrest the revolution of the shaft B. For convenience, the arm V is provided with an actuating-spring, S'. For convenience and to economize space, I make said enlargement only about one-third the whole travel of the shaft F, and broaden the end of the stop V to slightly exceed one-third said travel. I also, for convenience, reduce the cylindrical enlargement $v$ eccentrically at one end, as at $w$, so that the revolution of the shaft F will bring the stop-arm V again to the level of said enlargement. This position is easily recognized by the position of the clamp-screw $y$, which is placed so as to be upward when the shaft is in position to run back and forth freely.

The knife I is held in place by a clamp-bar, 8, and may be easily removed for resharpening. I find that about one dozen broaches may be barbed before the blade becomes sensibly dulled, and that one-fourth of one turn of the screw O will suffice to bring a fresh portion of the knife-edge into action.

The anvil-block W is capable of adjustment forward or backward by two set-screws, $x\ x$, provided with conical points which enter conical seats in said block. Said seats are slightly above line with said set-screws, and they therefore perform the threefold office of centering, adjusting, and clamping the block W down upon the bed A.

The socket $z$ serves to secure a standard for the support of a magnifying-glass, so that the action of the knife may be under constant observation.

Having described my invention, I claim—

1. The reciprocating knife-bar H, and the knife-carriage N, fitted to slide thereon, combined with the screw O, whereby said knife may be moved and held in position, as set forth.

2. The reciprocating knife-bar H, provided with an arm, Q, and a knife, I, combined with the anvil M, and the arm P, provided with a regulating-screw, $h$, to prevent torsion of said knife and bar at the moment of delivering its blow.

3. The reciprocating knife-bar H, with its knife I, and the anvil M, combined with the impelling-spring K, and the screw L, whereby the tension of said spring may be controlled and the force of the knife-blow regulated at will.

4. The reciprocating knife-bar with its knife I, and the impelling-spring K, combined with the tension-screw L, and the pointer $n$, and dial $p$, whereby the tension of the spring may be noted and regained, as set forth.

5. The reciprocating knife I, and the anvil M, with the driving-shaft B, and screw feed-shaft F, combined with the divided nut S, and rotating cam T, with its ribs U, whereby said nut is opened to permit the shaft F to slide freely, or locked to engage the screw, as set forth.

6. The anvil M and reciprocating knife I, combined with the pivoted clamp $l$, provided with the V-shaped notch 9, and its impelling-spring $m$, whereby the blank is centered and firmly held upon the anvil while being acted on by said knife without regard to its diameter.

7. The reciprocating knife I, the anvil-block W, and anvil M, with a groove between, combined with a pivoted clamp, $l$, adapted to close down into said groove, and provided with a V-shaped notch, 9, and overhanging shoulder 12, for the purpose of centering and securely holding the blank upon the anvil close to the point where the knife will strike, as and for the purpose set forth.

R. B. DONALDSON.

Witnesses:
   R. D. O. SMITH,
   N. B. SMITH.